US006944371B2

(12) United States Patent
Kaneko

(10) Patent No.: US 6,944,371 B2
(45) Date of Patent: Sep. 13, 2005

(54) LENS-INTEGRATED OPTICAL FIBER AND PRODUCTION METHOD THEREOF, OPTICAL MODULE, AND OPTICAL TRANSMISSION APPARATUS

(75) Inventor: Tsuyoshi Kaneko, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/761,368

(22) Filed: Jan. 22, 2004

(65) Prior Publication Data

US 2004/0165824 A1 Aug. 26, 2004

(30) Foreign Application Priority Data

Feb. 10, 2003 (JP) ....................................... 2003-032076

(51) Int. Cl.[7] ................................................ G02B 6/32
(52) U.S. Cl. ........................................ 385/33; 65/387
(58) Field of Search .............................. 385/33; 65/387

(56) References Cited

U.S. PATENT DOCUMENTS

| | | | | | |
|---|---|---|---|---|---|
| 4,193,663 | A | * | 3/1980 | Timmermann | 385/33 |
| 4,265,699 | A | * | 5/1981 | Ladany | 216/97 |
| 4,268,113 | A | * | 5/1981 | Noel, Jr. | 385/92 |
| 4,338,352 | A | * | 7/1982 | Bear et al. | 427/8 |
| 4,671,609 | A | * | 6/1987 | Khoe et al. | 385/33 |
| 5,498,684 | A | | 3/1996 | Bender | |
| 5,707,684 | A | | 1/1998 | Hayes et al. | |
| 6,549,704 | B2 | * | 4/2003 | Ukrainczyk | 385/33 |
| 6,674,940 | B2 | * | 1/2004 | Kroupenkine | 385/33 |
| 2001/0033712 | A1 | * | 10/2001 | Cox et al. | 385/33 |
| 2002/0118924 | A1 | * | 8/2002 | Murata | 385/52 |
| 2002/0131699 | A1 | * | 9/2002 | Raguin et al. | 385/33 |
| 2003/0053751 | A1 | * | 3/2003 | Ukrainczyk et al. | 385/33 |
| 2003/0138201 | A1 | * | 7/2003 | Mikolas | 385/33 |

FOREIGN PATENT DOCUMENTS

| | | | | | |
|---|---|---|---|---|---|
| EP | 0260742 | A1 | * | 3/1988 | G02B/6/26 |
| JP | U-59-161116 | | | 10/1984 | |
| JP | A-59-192219 | | | 10/1984 | |
| JP | A-60-156023 | | | 8/1985 | |
| JP | 02277006 | A | * | 11/1990 | G02B/6/10 |
| JP | A 07-179823 | | | 7/1995 | |
| JP | 08043678 | A | * | 2/1996 | G02B/6/32 |
| JP | A 08-286082 | | | 11/1996 | |
| JP | A-9-197196 | | | 7/1997 | |
| JP | A 2000-67449 | | | 3/2000 | |
| JP | 2000304967 | A | * | 11/2000 | G02B/6/32 |
| JP | 2002221627 | A | * | 8/2002 | G02B/6/10 |
| JP | A 2003-240911 | | | 8/2003 | |
| JP | A 2003-240913 | | | 8/2003 | |
| JP | A 2003-258380 | | | 9/2003 | |

* cited by examiner

*Primary Examiner*—Akm Enayet Ullah
*Assistant Examiner*—Michelle R. Connelly-Cushwa
(74) *Attorney, Agent, or Firm*—Oliff & Berridge, PLC

(57) ABSTRACT

To provide a lens-integrated optical fiber with low cost and well controlled optical properties, and production method thereof a lens-integrated optical fiber includes an optical fiber and a lens mounted on an end face of the optical fiber.

19 Claims, 7 Drawing Sheets

LENS-INTEGRATED OPTICAL FIBER AND PRODUCTION METHOD THEREOF, OPTICAL MODULE, AND OPTICAL TRANSMISSION APPARATUS

BACKGROUND OF THE INVENTION

1. Field of Invention

The present invention relates to a lens-integrated optical fiber and production method thereof.

The present invention also relates to an optical module and an optical transmission apparatus, both of which include the lens-integrated optical fiber.

2. Description of Related Art

In recent years, information and telecommunication is becoming faster and larger in volume, and the development of optical communications has been progressing. Generally, in related art optical communication, an electrical signal is converted into an optical signal, transmitted through an optical fiber, and then the received optical signal is converted back to an electrical signal. For conversion between electrical and optical signals, an optical element is used.

For such optical communication, a spherical lens integrated optical fiber may be used as an optical fiber. They have a semi-spherical lens at each end. By using a spherical lens integrated optical fiber, a lens, which is placed between an optical fiber end and an optical element in the related art can be omitted. Thus the adjustment of the light path becomes easier and an apparatus can be made smaller.

However, manufacturing a spherical lens integrated optical fiber requires a complicated process in many cases. Thus, a spherical lens integrated optical fiber is considerably more expensive than regular optical fibers in general.

The present invention provides a lens-integrated optical fiber that is low cost and well-controlled in optical properties, and production method thereof.

The present invention also provides an optical module and an optical transmission apparatus, both including the lens-integrated optical fiber.

SUMMARY OF THE INVENTION

A lens-integrated optical fiber according to an aspect of the present invention includes a lens mounted on an end face of an optical fiber, the lens being formed so that the maximum width $d_2$ of the maximum cross section $S_1$ of the lens is greater than the maximum width $d_1$ of the end face of the optical fiber, where the maximum cross section $S_1$ is the cross section of the lens cut by a plane that is parallel with the end face of the optical fiber and that makes the cross section area of the lens greatest.

The lens-integrated optical fiber according to an aspect of the present invention includes an optical fiber including a core and a clad; and a lens mounted on the end face of the core, at an end of the optical fiber.

The cross section of the optical fiber is not limited to a particular shape as long as the lens can be mounted thereon. The shape may be circular or elliptic. Similarly, the cross section of the lens is not limited to a particular shape.

"The maximum cross section $S_1$" refers to the cross section of greatest area out of cross sections of the lens cut by a plane that is parallel with the end face of the optical fiber. "The maximum width $d_2$ of the maximum cross section $S_1$" refers to the greatest width at the maximum cross section $S_1$ described as above. Furthermore, "the maximum width $d_1$ of the end face of the optical fiber" refers to the greatest width of the end face of the optical fiber, for example, when the end face is circular, $d_1$ is the diameter of the circle defined by the end face of the optical fiber, and when the end face is elliptic, $d_1$ is the major axis of the ellipse defined by the end face of the optical fiber.

According to the lens-integrated optical fiber of an aspect of the present invention, by having the above-described structure, a distance between the top of the surrounding of the lens and the end face of the optical fiber can be longer, thus the effect of the lens can be enhanced.

In an aspect of the invention, material of an optical fiber is not limited to a particular type. An optical fiber made of material, such as silica glass, plastic, composite of plastic and silica glass, or multi-component glass can be applied for the invention.

In this lens-integrated optical fiber, the end face of the core and the end face of the clad can be set to the condition so that they differ in height at the end of the optical fiber.

In this case, the core can be set to the condition that it is not covered with the clad at the end of the optical fiber. For this reason, at the end of the optical fiber, the core and the clad can form a protrusion.

At the end of the optical fiber, the surrounding of the core can be covered with a sealing agent. This kind of structure can securely mount the lens on the end of the optical fiber, thereby the high production yields of the lens-integrated optical fiber can be attained.

Furthermore, the maximum width $d_4$ of the maximum cross section $S_2$ of the lens can be made greater than the maximum width $d_3$ of the end face of the core, where the maximum cross section $S_2$ is the cross section of the lens cut by a plane that is parallel with the end face of the core and that makes the cross section area of the lens greatest.

"The maximum cross section $S_2$" refers to the cross section of greatest area out of cross sections of the lens cut by a plane that is parallel with the end face of the core. "The maximum width $d_3$ of the end face of the core" refers to the greatest width of the end face of the core, for example, when the end face of the core is circular, $d_3$ is the diameter of the circle defined by the end face of the core, and when the end face of the core is elliptic, $d_3$ is the major axis of the ellipse defined by the end face of the core. Further, "the maximum width $d_4$ of the maximum cross section $S_2$" refers to the greatest width at the maximum cross section $S_2$ described as above.

This structure can mount the lens with a high lens effect on the end face of the core.

In this case, at the end of the optical fiber, the clad can be set to the condition that it does not cover the core. Thus the core and the clad form a recess. This structure can securely mount the lens on the end face of the core, thereby the high production yields of the lens-integrated optical fiber can be attained.

In the lens-integrated optical fiber, the refractive index of the lens of can be substantially equalized to that of the core.

Furthermore, the refractive index of the lens can be made greater than that of the sealing agent, and the refractive index of the sealing agent can be substantially equalized to that of the clad.

In this lens-integrated optical fiber, the lens can be formed by curing the liquid material, which is curable, by applying energy to the liquid material. Because the lens can be adjusted to a desired shape and size in this way, the lens-integrated optical fiber including the lens of well-controlled optical properties can be attained.

In this case, the lens can be made of ultraviolet-cured resin.

An optical module according to an aspect of the present invention includes the above-described lens-integrated optical fiber of the present invention, an optical element having an optical part, and a semiconductor chip electrically connected to the optical element.

By incorporating the lens-integrated optical fiber and the optical element, the optical module of an aspect of the invention can be made smaller and of lower cost as well as less complicated, compared to a related art optical module placing a separate lens between an optical fiber and an optical element.

Furthermore, compared to a related art optical module placing a separate lens between an optical fiber and an optical element, the, lens-integrated optical fiber of an aspect of the invention does not need aligning a separate lens with an optical fiber and an optical element, because the lens is integrated with the optical fiber. Thus the adjustment of the light path can be simplified, because only the aligning between the lens-integrated optical fiber and the optical element is necessary.

An optical transmission apparatus of an aspect of the present invention includes: the above-described lens-integrated optical fiber of an aspect of the present invention; a light emitting element, of which a light emitting part faces one end face of the optical fiber; a semiconductor chip that is electrically connected to the light emitting element and packaged together with the light emitting element; a light receiving element, of which a light receiving part faces the other end face of the optical fiber; and a semiconductor chip that is electrically connected to the light receiving element and packaged together with the light receiving element.

A method to produce a lens-integrated optical fiber of an aspect of the present invention includes the steps of: (a) forming a lens precursor on the end face of the optical fiber by discharging a liquid drop on the end face of the optical fiber; and (b) forming the lens by curing the lens precursor, the lens being formed so that the maximum width $d_2$ of the maximum cross-section $S_1$ of the lens is greater than the maximum width $d_1$ of the end face of the optical fiber, where the maximum cross section $S_1$ is the cross section of the lens cut by a plane that is parallel with the end face of the optical fiber and that makes the cross section area of the lens greatest.

A method to produce a lens-integrated optical fiber of an aspect of the present invention includes the steps of: (a) forming a lens precursor on the end face of the core by discharging a liquid drop on the end face of the core, which is at an end of an optical fiber including core and clad; and (b) forming a lens by curing the lens precursor.

According to the production methods of the lens-integrated optical fiber of an aspect of the present invention, a lens-integrated optical fiber including a lens adjusted to a desired shape and size and well-controlled in optical properties can be attained with a simpler method.

In the method to produce a lens-integrated optical fiber, prior to the above-described steps (a) and (b), the following step (c) can be further included: (c) forming the end of the optical fiber in a way that the end face of the core differs in height from the end face of the clad, at the end of the optical fiber.

In this case, the step (c) can also include removing the clad around the core at the end of the optical fiber, or the step (c) can include extending the core at the end of the optical fiber.

Furthermore, in this case, the following step (d) can be included: (d) covering the surrounding of the core with sealing agent.

Furthermore, in this case, the lens can be formed so that the maximum width $d_4$ of the maximum cross section $S_2$ of the lens is greater than the maximum width $d_3$ of the end face of the core, where the maximum cross section $S_2$ is the cross section of the lens cut by a plane that is parallel with the end face of the core and that makes the cross section area of the lens greatest.

In this case, a step of removing the core adjacent to the clad at the end of the optical fiber can be included.

In this method to produce a lens-integrated optical fiber, an inkjet method can be used for the discharging of the liquid drop. Because this inkjet method can conduct fine adjustment of the discharging amount of liquid drop, a microscopic lens can be mounted on the end face of optical fiber in a simple method.

In this production method for a lens-integrated optical fiber, the lens precursor can be cured by applying energy to the lens precursor.

In this case, the lens precursor is made of ultraviolet-cured resin, and the energy is ultraviolet light. The lens precursor is cured by the ultraviolet light in a following manner. The ultraviolet light is incident on the end face of the core, then it propagates in the core, exits from the other end of the optical fiber, and then irradiates the lens precursor. Because the ultraviolet light exits from the end face of the core and directly irradiates the lens precursor, this method can cure the lens precursor reliably, and can cure the lens precursor efficiently with less amount of ultraviolet light.

DETAILED DESCRIPTION OF EXEMPLARY EMBODIMENTS

Hereinafter, exemplary embodiments of the present invention are explained with reference to the accompanying figures.

First Exemplary Embodiment

1. Structure of Lens-Integrated Optical Fiber

Figure 1A:
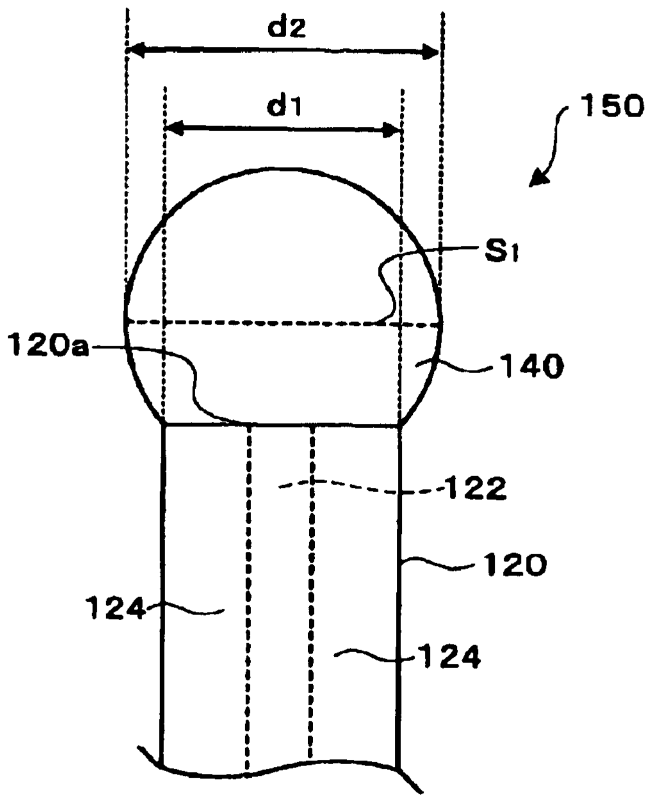
FIG. 1(A) is a schematic side view of a lens-integrated optical fiber according to a first exemplary embodiment of the present invention.
Figure 1B:
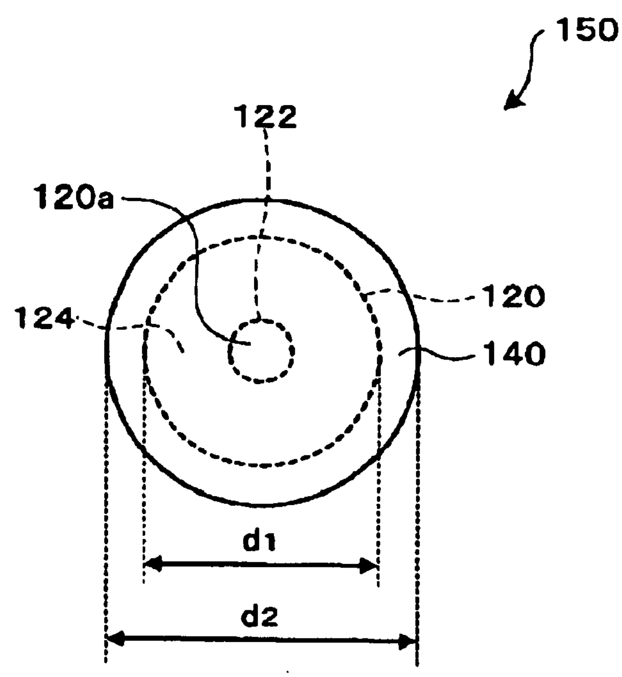
FIG. 1(B) is a schematic front view of the lens-integrated optical fiber shown in FIG. 1(A)

FIG. 1(A) is a schematic side view of a lens-integrated optical fiber 150 according to an exemplary embodiment of the present invention. FIG. 1(B) is a schematic front view of the lens-integrated optical fiber 150 shown in FIG. 1(A). FIGS. 1(A) and (B) show an end of an optical fiber 120 of the lens-integrated optical fiber 150, where a lens 140 is mounted on the end face 120*a*.

As shown in FIGS. 1(A) and (B), the lens-integrated optical fiber 150 according to the exemplary embodiment includes the optical fiber 120 and the lens 140 mounted on the end face 120*a* of optical fiber 120.

Optical Fiber

Generally, the optical fiber 120 includes a core 122 and a clad 124. The clad 124 surrounds the core 122 coaxially. In the optical fiber 120, because light is reflected at the interface between the core 122 and the clad 124, light is confined and propagates within the core 122. The outer surface of clad 124 can be protected by a jacket (not shown).

Although the cross section of the optical fiber 120 is circular in the exemplary embodiment, it is not limited to a particular shape. This is similarly applied to optical fibers according to exemplary embodiments and modifications described later. For example, as for the optical fiber 120, an optical fiber having an elliptic cross section, or an optical fiber having a circular or elliptic core and a clad shaped in other way, can be used.

FIGS. 1(A) and (B) show an end (an end of one side) of the optical fiber 120. The lens-integrated optical fiber 150 may have the lens 140 formed on each of the end face 120*a* of the optical fiber 120, or on one end face 120*a* of the optical fiber 120. This is similarly applied to lens-integrated optical fibers in exemplary embodiments and modifications described later.

Lens

As shown in FIGS. 1(A) and (B), the lens 140 is mounted on the end face 120*a* of the optical fiber 120. And the maximum width $d_2$ of the maximum cross section $S_1$ is greater than the maximum width $d_1$ of the end face 120*a* of the optical fiber 120, where the maximum cross section $S_1$ is the greatest cross section area of the lens 140 out of cross sections of the lens 140 cut by a plane that is parallel with the end face 120*a* of the optical fiber 120.

Because the maximum cross section $S_1$ is circular for the lens-integrated optical fiber 150, the maximum width $d_2$ of maximum cross section $S_1$ is the diameter of the circle defined by maximum cross section $S_1$. Although not shown, if the maximum cross section $S_1$ is substantially elliptic, the maximum width $d_2$ of maximum cross section $S_1$ will be the major axis of the ellipse defined by the maximum cross section $S_1$.

Furthermore, in the lens-integrated optical fiber 150, the maximum width $d_1$ of the end face 120*a* of the optical fiber 120 is the greatest width of the fiber at the end face 120*a* of the optical fiber 120. Because the end face 120*a* of the optical fiber 120 is circular in the exemplary embodiment, the maximum width $d_1$ of the end face 120*a* of the optical fiber 120 is the diameter of the circle, which is defined by the end face 120*a* of the optical fiber 120. Although not shown, if the end face 120*a* of the optical fiber 120 is substantially elliptic, the maximum width $d_1$ of the end face 120*a* of the optical fiber 120 will be the major axis of the ellipse, which is defined by the end face 120*a* of the optical fiber 120.

When light that exits from the optical fiber 120 is, for example, incident into a light receiving element (not shown), the light from the optical fiber 120 can be focused by the lens 140 before it is incident into the light receiving element. Or when light emitted by a light emitting element (not shown) is, for example, incident into the optical fiber 120, the light emitted by a light emitting element is incident into the lens 140, and is focused by the lens 140 before the light can be incident into the optical fiber 120.

The lens 140 can be formed by curing a liquid material that is curable with energy applied to the liquid material. As for the liquid material, precursors made of ultraviolet-cured resin and thermosetting resin can be listed as examples. As for the ultraviolet-cured resin, ultraviolet-cured acrylic resin and ultraviolet-cured epoxy resin can be listed as examples, and as for the thermosetting resin, thermosetting polyimide resin can be listed as an example.

Furthermore, the refractive index of lens 140 can be substantially equal to that of the core 122 of the optical fiber 120. Because this structure can reduce the reflection at the interface between the lens 140 and the core 122, the light loss at the interface can be reduced. This is similarly applied to exemplary embodiments and modifications described later.

To be specific, the lens 140 can be formed by curing a lens precursor (described later), which is formed by discharging a liquid drop on the end face 120*a* of the optical fiber 120.

To be more specific, the lens 140 is formed from the precursor, such as ultraviolet-cured resin and thermosetting resin. The shape and size of lens 140 can be controlled by adjusting the type and amount of the liquid material used for forming the lens 140. For example, in FIGS. 1(A) and (B), a case that the maximum width $d_2$ of the maximum section $S_1$ is greater than the maximum width $d_1$ of the end face 120*a* of optical fiber 120 is shown, but it is also possible to make the maximum width $d_2$ of the maximum section $S_1$ less than the maximum width $d_1$ of the end face 120*a* of optical fiber 120 by adjusting the type and amount of the liquid material used for forming the lens 140. This is similarly applied to the lens 240 in the second exemplary embodiment described later.

2. Production Methods of Lens-Integrated Optical Fiber

Figure 2:
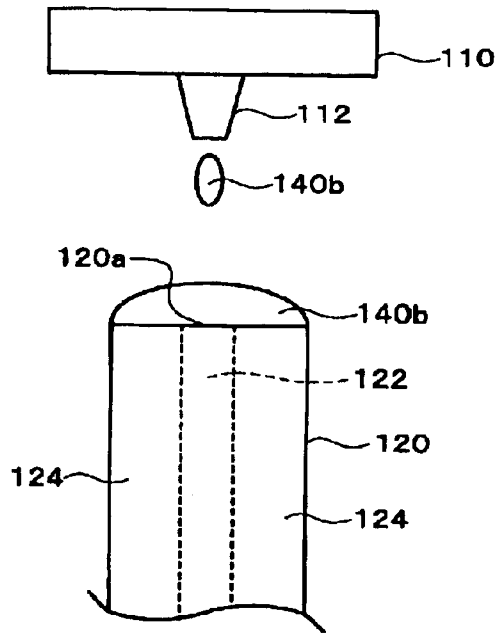
FIG. 2 schematically shows a production step of the lens-integrated optical fiber shown in FIGS. 1(A) and (B)
Figure 3:
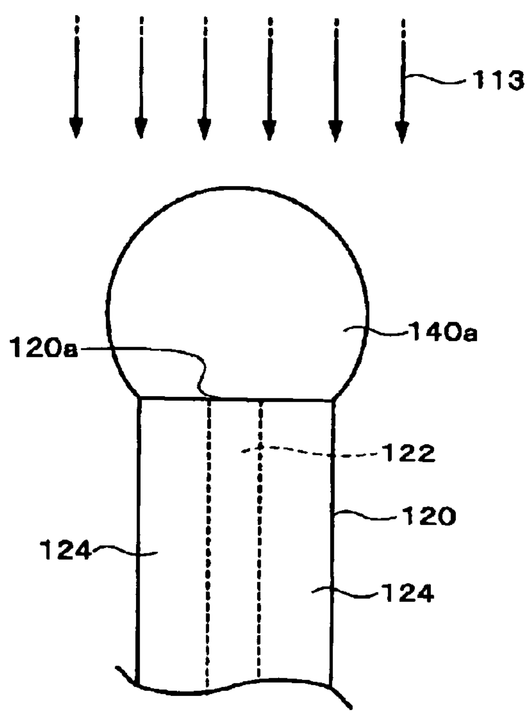
FIG. 3 schematically shows a production step of the lens-integrated optical fiber shown in FIGS. 1(A) and (B)

Next, a production method of the lens-integrated optical fiber 150, shown in FIGS. 1(A) and (B), is explained with reference to FIG. 2 and FIG. 3. FIG. 2 and FIG. 3 schematically show a production step of the lens-integrated optical fiber 150.

Forming Lens Precursor

At first, a lens precursor 140*a* is formed on the end face 120*a* of the optical fiber 120 (refer to FIG. 2 and FIG. 3). To be specific, a liquid drop 140*b* of liquid material for lens the 140 is discharged on the end face 120*a* of the optical fiber 120 to form the lens precursor 140*a*. As above described, the liquid material has a curable characteristic caused by the application of energy.

As for methods to discharge the liquid drop 140*b*, such as a dispenser method and an inkjet method can be listed. The dispenser method is a general method to discharge liquid drops, and is effective to discharge the liquid drop 140*b* over a relatively large area. On the other hand, the inkjet method uses an inkjet head to discharge liquid drops, and can control the discharging position in the order of μm and the amount of discharged liquid drops in the order of picoliter. Thus, the inkjet method can produce a microscopic lens on an end face of a fine optical fiber.

As shown in FIG. 2, a method using an inkjet head 110 to discharge the liquid drop 140*b* Is explained. As shown in FIG. 2, the liquid drop 140*b* of liquid material is discharged on the end face 120*a* of the optical fiber 120 by using the inkjet 110 in order to form the lens precursor 140*a* on the end face 120*a* of the optical fiber 120, as shown in FIG. 3. By discharging the liquid drop 140*b* more than once, as required, the lens precursor 140*a* with a desired shape and size is formed on the end face 120*a* of the optical fiber 120.

By giving lyophilic or lyophobic treatment to the end face 120*a* of the optical fiber 120 before the liquid drop 140*b* is discharged, as required, the wettability of end face 120*a* to the liquid drop 140*b* can be controlled. With this treatment, the shape and size of the lens 140 can be more precisely controlled.

Forming of Lens

Next, the lens precursor 140*a* is cured to form the lens 140 (refer to FIG. 1 and FIG. 3). To be specific, energy 113, such as heat and light, is applied to the lens precursor 140*a* as shown in FIG. 3.

When curing the lens precursor 140*a*, a suitable method needs to be selected depending on the type of the liquid material. As for the specific curing method, the application of heat energy and the irradiation of light, such as ultraviolet and laser can be listed. The amount of applied energy 113 needs to be suitably adjusted depending on the shape, size, and material of the lens precursor 140*a*. The above-described process provides the lens-integrated optical fiber 150 including the optical fiber 120 and the lens 140 formed on the end face 120*a* of the optical fiber 120 (refer to FIG. 1).

3. Effects of the Invention

The lens-integrated optical fiber and the production method thereof according to the exemplary embodiment have the following advantages. With these advantages, the lens-integrated optical fiber 150 of low cost and well-controlled optical properties can be provided.

(1) First, the maximum width $d_2$ of the maximum cross section $S_1$ is greater than the maximum width $d_1$ of the end face 120*a* of the optical fiber 120. For this reason, the distance between the top of the surrounding of the lens 140 and the end face. 120*a* of the optical fiber 120 can be set longer, thereby enhancing the lens effect of the lens 140.

(2) Second, the size and shape of the lens 140 can be precisely controlled. That is, the shape of the lens 140 can be controlled by the discharged amount of the liquid drop 140*b*. Thus the lens-integrated optical fiber 150 including the lens 140 of a desired shape and size can be provided. The reasons are explained as follows.

According to the lens-integrated optical fiber 150 of the exemplary embodiment, as shown in FIG. 1, the lens precursor 140*a* is formed on the end face 120*a* of the optical fiber 120. Therefore, unless the side surface of optical fiber 120 becomes wet with the material of lens precursor 140*a*, the lens precursor 140*a* is mainly under the action of surface tension. Therefore, by adjusting the amount of liquid drop 140*b* to form the lens precursor 140*a*, the shape and size of lens precursor 140*a* can be controlled, and thus the lens 140 of a desired shape and size can be provided.

(3) Third, the mounting position of the lens 140 can be precisely controlled. As described above, the lens 140 is formed by curing the precursor 140*a* formed by discharging the liquid drop 140*b* on the end face 120*a* of the optical fiber 120 (refer to FIG. 2 and FIG. 3).

In general, precise control of the landing position of a discharged liquid drop is difficult. This method, however, can form the lens 140 precisely on the end face 120*a* of the optical fiber 120 without any particular positioning. That is, when the liquid drop 140*b* is discharged and landed on the end face 120*a* of the optical fiber 120, it wets and spreads over the end face 120*a*. Because of this, the lens precursor 140*a* can be formed precisely on the end face 120*a* without precise positioning. Thus the lens 140, which mounting position is precisely controlled, can be attained with a simple method.

Second Exemplary Embodiment

1. Structure of Lens-Integrated Optical Fiber

Figure 4A:
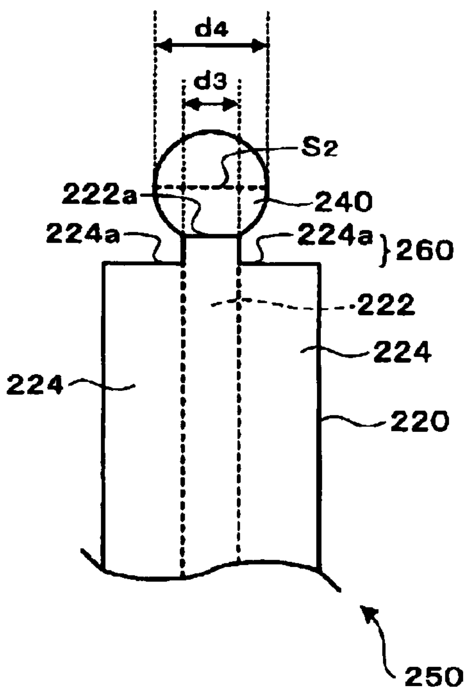
FIG. 4(A) is a schematic side view of a lens-integrated optical fiber according to a second exemplary embodiment of the present invention.
Figure 4B:
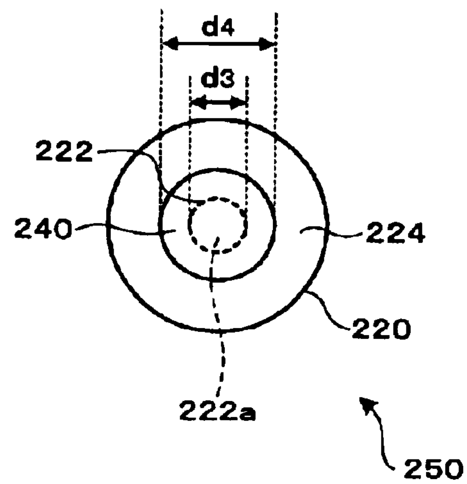
FIG. 4(B) is a schematic front view of the lens-integrated optical fiber shown in FIG. 4(A)

FIG. 4(A) is a schematic side view of a lens-integrated optical fiber 250 according to another exemplary embodiment of the present invention. FIG. 4(B) is a schematic front view of the lens-integrated optical fiber 250 shown in FIG. 4(A). FIGS. 4(A) and (B) show the end of an optical fiber 220 where a lens 240 is mounted on an end face 220*a*.

The lens-integrated optical fiber 250 of the exemplary embodiment includes the optical fiber 220 and the lens 240 mounted on an end face 222*a* of a core 222 of the optical fiber 220, as shown in FIGS. 4(A) and (B).

As shown in FIGS. 4(A) and (B), the lens-integrated optical fiber 250 of the exemplary embodiment is different in structure from the lens-integrated optical fiber 150 according to the first exemplary embodiment, in that the end face 222*a* of the core 222 and the end face 224*a* of the clad 224 are different in height at the end of optical fiber 220, and that the lens 240 is mounted on the end face 222*a* of the core 222 of the optical fiber 220.

In describing the lens-integrated optical fiber 250 and the production method thereof, structural elements similar to that of the lens-integrated optical fiber 150 according to the first exemplary embodiment have been given the same reference numerals, and detailed explanation for them will be omitted.

Optical Fiber

The optical fiber 220 includes the core 222 and the clad 224. The exemplary embodiment shows the case that the core 222 is not covered with the clad 224 at the end of the optical fiber 220 shown in FIG. 4(A). That is, at the end of optical fiber 220 shown in FIG. 4(A), the end face 222*a* of the core 222 protrudes from the end face 224*a* of the clad 224, and the core 222 and the clad 224 forms a protrusion 260.

The optical fiber 220 can be made of materials similar to those described for the optical fiber 120 in the first exemplary embodiment.

Lens

The lens 240 is mounted on the end face 222*a* of the core 222 of the optical fiber 220, as shown in FIG. 4(A) and (B). The maximum width $d_4$ of the maximum cross section $S_2$ can be made greater than the maximum width $d_3$ of the end face 222*a* of the core 222 of the optical fiber 220, where the maximum cross section $S_2$ is the greatest cross section area of the lens 240 out of cross sections of the lens 240 cut by a plane that is parallel with the end face 222*a* of the core 222.

Because the maximum cross section $S_2$ is circular in the lens-integrated optical fiber 250, the maximum width $d_4$ of the maximum cross section $S_2$ is the diameter of the circle defined by the maximum cross section $S_2$. Although not shown, if the maximum cross section $S_2$ is substantially elliptic, the maximum width $d_4$ of the maximum cross section $S_2$ will correspond to the major axis of the ellipse defined by the maximum cross section $S_2$. This is similarly applied to exemplary embodiments and modifications described later, when the maximum cross section $S_2$ is substantially circular or elliptic.

In the lens-integrated optical fiber 250, the maximum width $d_3$ of the end face 222*a* of the core 222 is the greatest width at the end face 222*a* of the core 222 of the optical fiber 220. Because the end face 222*a* of the core 222 is circular in the exemplary embodiment, the maximum width $d_3$ of the end face 222*a* of the core 222 is the diameter of the circle defined by the end face 222*a* of the core 222. Although not shown, when the end face 222*a* of the core 222 is substantially elliptic, the maximum width $d_3$ will be the major axis of the ellipse defined by the end face 222*a* of the core 222. This is similarly applied to exemplary embodiments and modifications described later, when the end face of the core of the optical fiber is substantially circular or elliptic.

The lens 240 can be made of materials similar to those used for the lens 140 in the first exemplary embodiment.

And the lens 240 is formed in the method similar to that used for the lens 140 in the first exemplary embodiment. To be specific, the lens 240 can be made by curing a lens precursor (described later), which is formed by discharging a liquid drop on the end face 222*a* of the core 222 of the optical fiber 220.

2. Production Methods of Lens-Integrated Optical Fiber

Next, a production method of the lens-integrated optical fiber 250 shown in FIGS. 4(A) and (B) are explained. For a production step similar to that of lens-integrated optical fiber 150 in the first exemplary embodiment, explanation will be omitted in principle.

Processing End Faces of Core and Clad

Figure 5:
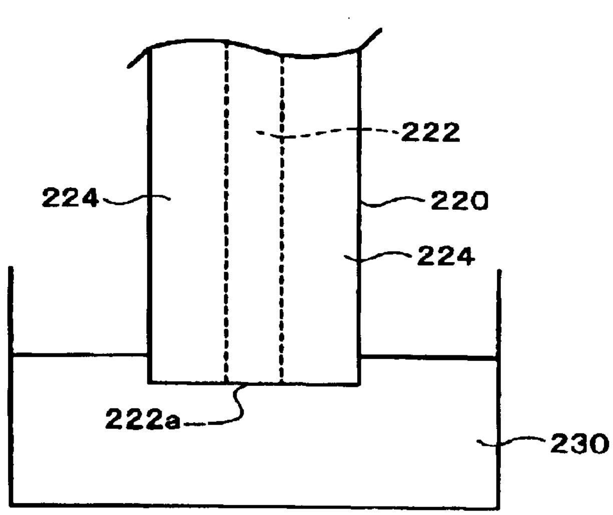
FIG. 5 schematically shows a production step of the lens-integrated optical fiber shown in FIGS. 4(A) and (B);.
Figure 6:
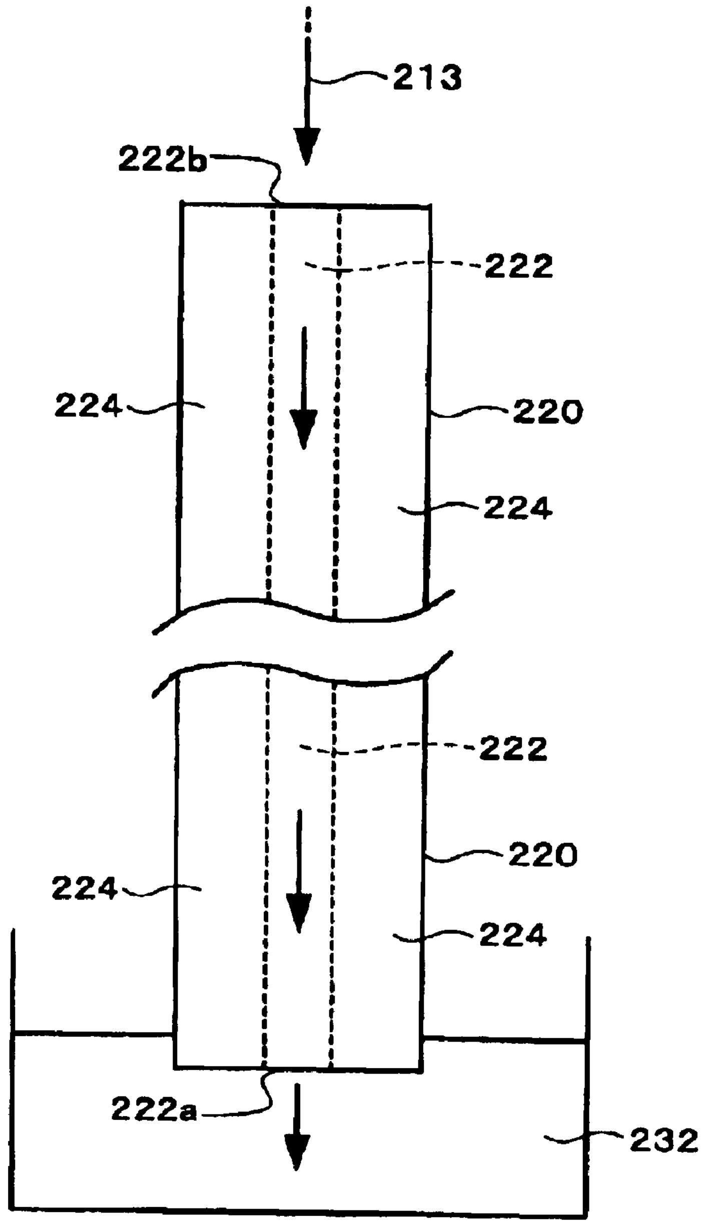
FIG. 6 schematically shows a production step of the lens-integrated optical fiber shown in FIGS. 4(A) and (B)

At first, the process of making the end face 222*a* of the core 222 protrude from the end face 224*a* of the clad 224 is described. As for making the end face 222*a* of the core 222 protrude from the end face 224*a* of the clad the 224, the processes shown in FIG. 5 and FIG. 6 are given as specific methods.

(1) Wet Etching Process

At first, a wet etching process to make the end face 222*a* of the core 222 protrude from the end face 224*a* of the clad 224 is described with reference to FIG. 5. An explanation is made on a case where the optical fiber 220 is a quartz optical fiber.

Generally, in an optical fiber, a core and a clad have different ingredients to make the refractive index of the core greater than that of the clad. By using the ingredients difference between of the core and the clad, the core and the clad can be selectively etched away by the wet etching.

For example, an etchant, which can selectively etch away the clad 224 by conducting wet etching to the flat end of the optical fiber (refer to FIG. 5) is used. Thus, the end face 222*a* of the core 222 can be protruded from the end face 224*a* of the clad 224.

As for an etchant that selectively etches away the core and the clad of the quartz optical fiber, an aqueous solution of mixture of hydrofluoric acid and ammonium fluoride (a buffer solution of hydrofluoric acid) is used, for example. By adjusting the concentration of hydrofluoric acid and the concentration of ammonium fluoride in the buffer solution of hydrofluoric acid, the clad 224 can be selectively etched away.

The wet etching process is shown schematically in FIG. 5. As shown in FIG. 5, the end of the optical fiber 220 is immersed in the etchant 230. Because the clad 224 is selectively dissolved, the etchant can etch away the clad 224 at the end of optical fiber 220.

For a specific example, by using a buffer solution of hydrofluoric acid prepared by mixing an aqueous solution of 40 weight percent of ammonium fluoride, an aqueous solution of 50 weight percent of hydrofluoric acid, and pure water ($H_2O$) in a predetermined volume ratio, the clad 224 can be etched away selectively.

By adjusting the concentrations of the hydrofluoric acid and of ammonium fluoride in the buffer solution of hydrofluoric acid, the core 222 can be also selectively etched away. Further details for this case will be explained in an exemplary embodiment described later.

(2) Light-Curing Process

Next, a process of extending the core 222 by light-curing is described with reference to FIG. 6. This process makes the end face 222*a* of the core 222 protrude from the end face 224*a* of the clad 224 by extending light-curing resin to the end face of the core 222 of the optical fiber 220. The material of optical fiber 220 is not limited to a particular type as long as the material adheres well to the light-curing resin.

To be specific, as shown in FIG. 6, an end (an end of one side) of optical fiber 220 having the core end face 222*a* is immersed in the liquid material 232 containing a precursor of the ultraviolet-cured resin. At the other end of the optical fiber 220, ultraviolet light 213 is incident into the end face 222*b* of the core. The ultraviolet light 213, incident into the end face 222*b* of the core, propagates in the core 222 and exits from the end face 222*a*. Because the ultraviolet light is not introduced into the clad 224, the ultraviolet light 213 exits only from the end face 222*a* of the core 222 without exiting through the clad 224. Thus, the ultraviolet light 213 that exits from the end face 222*a* of the core 222 causes the ultraviolet-cured resin contained in the liquid material 232 to react at the end face 222*a* of the core 222. As a result, the core 222 is extended by forming the ultraviolet-cured resin on the end face 222*a* of the core 222, and thus the optical fiber 220 is provided with the end face 222*a* of the core 222 protruding from the end face 224*a* of the clad 224, as shown in FIG. 4.

FIG. 6 shows an example that one end of the optical fiber 220 was immersed in the liquid material 232 to extend the core 222. Instead of immersing the end of the optical fiber 220 in the liquid material 232, the core 222 can be extended by placing the liquid material on one end face of the optical fiber 220 and then by introducing ultraviolet light from the other end of the core 222 in a similar manner shown in FIG. 6.

Forming Lens

Next, the lens 240 is formed on the end face 222*a* of the core 222 of the optical fiber 220. The methods to form the lens 240 in the exemplary embodiment are similar to those to form the lens 140 in the first exemplary embodiment, except that the lens 240 is formed on the end face 222*a* of the core 222 of the optical fiber 220. As for the material of the lens 240, a similar material to that of the lens 140 in the first exemplary embodiment can be used.

To be specific, by discharging a liquid drop of liquid material to form the lens 240 on the end face 222*a* of the core 222 of the optical fiber 220, a lens precursor is formed on the end face 222*a* of the core 222. Then, the lens 240 is formed by curing the lens precursor by applying energy to the lens precursor.

Figure 7:
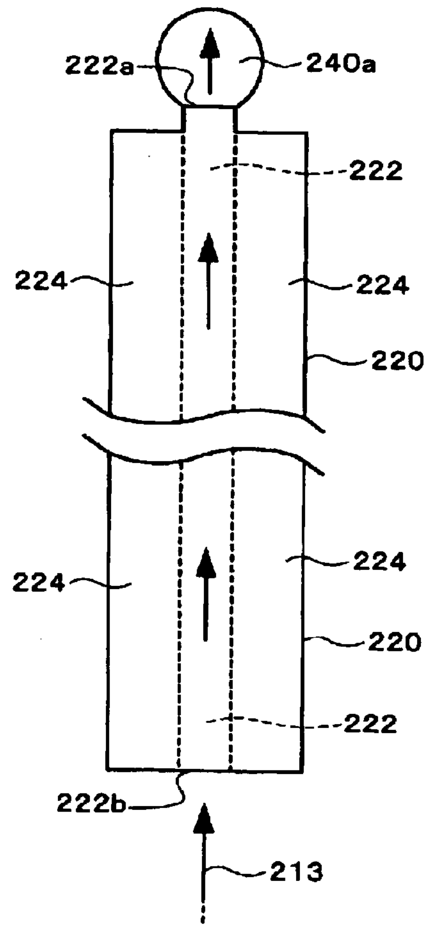
FIG. 7 schematically shows a production step of the lens-integrated optical fiber shown in FIGS. 4(A) and (B)

An example of the method to cure the lens precursor is shown in FIG. 7. In this example, an explanation is given to the lens precursor made of ultraviolet-cured resin. FIG. 7 shows the lens precursor 240*a* mounted on the optical fiber 220 and on the end face 222*a* of the core 222 of the optical fiber, at the end of the optical fiber 220. Note that instead of the method shown here, the lens precursor 240*a* can be cured in the method described in the first exemplary embodiment (refer to FIG. 3).

At first, as shown in FIG. 7, ultraviolet light 213 is incident into the end face 222*b* of the core, at the other end of optical fiber 220. The ultraviolet light 213, incident into the end face 222*b*, propagates in the core 222 and exits from the end face 222*a*. Because the ultraviolet light is not introduced into the clad 224, the ultraviolet light 213 exits only from the end face 222*a* of the core 222 without exiting through the clad 224. Thus, the ultraviolet light 213 that exits from the end face 222*a* of the core 222 causes the lens precursor 240*a*, formed on the end face 222*a* of the core 222, to cure. As a result, the lens 240 formed on the end face 222*a* of the core 222, as shown in FIGS. 4(A) and (B), can be provided.

In this method, because the ultraviolet light 213 exits from the end face 222*a* of the core 222 and directly irradiates the lens precursor 240*a*, the lens precursor 240*a* can be cured reliably as well as efficiently with a less amount of ultraviolet light.

Thus, the lens-integrated optical fiber 250 with the lens 240 mounted on the end face 222*a* of the core 222 of the optical fiber 220 can be provided (refer to FIGS. 4(A) and (B)).

The above-described curing method can be used not only for the exemplary embodiment but also for other exemplary embodiments when curing lens precursors. Especially, when curing a lens precursor formed on an end face of a core, or when a lens precursor is formed on each end face of a core and a clad of an optical fiber but the clad thickness is relatively thin in comparison with that of the core, because the ultraviolet light that exits from the end face of the core is efficiently introduced into the lens precursor, the lens precursor can be cured reliably.

3. Effects of the Invention

The lens-integrated optical fiber 250 and the production method thereof in the exemplary embodiment have the advantages similar to those of the lens-integrated optical fiber 150 and the production method thereof in the first exemplary embodiment.

Furthermore, according to the lens-integrated optical fiber 250 in the exemplary embodiment, the lens 240 is mounted on the end face 222*a* of the core 222 of the optical fiber 220. In the optical fiber 220, the light propagates only in the core 222 in practice. Thus, because the lens 240 is mounted only on the end face 222*a* of the core 222, in the case that light is introduced into the core 222 from the outside through the lens 240, the light can be introduced into the core 222 efficiently. And in the case that light, which propagates in the core 222, is focused by the lens 240 and exits outside, the lens 240 can focus the light efficiently before the light is released to the outside.

4. Modification

Figure 8A:
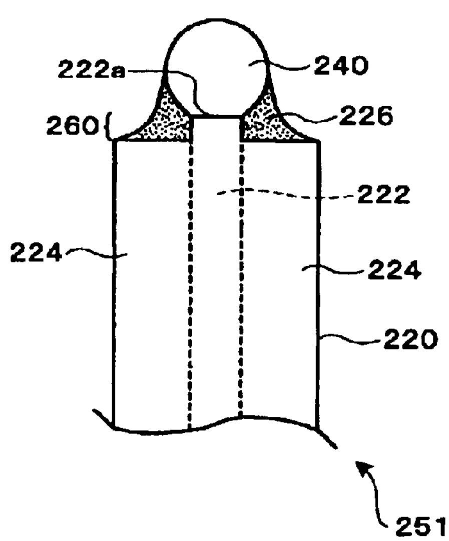
FIG. 8(A) schematically shows a modification of the lens-integrated optical fiber shown in FIGS. 4(A) and (B)
Figure 8B:
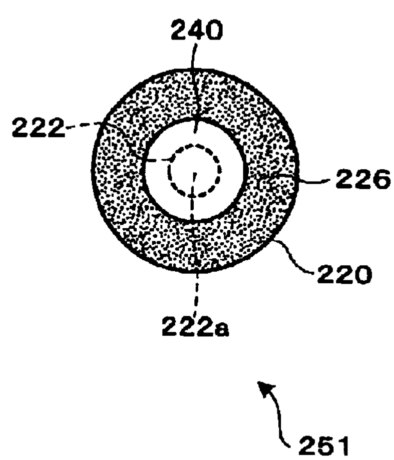
FIG. 8(B) is a schematic front view of the lens-integrated optical fiber shown in FIG. 8(A)

Next, a modification of the lens-integrated optical fiber according to the exemplary embodiment is described. FIG. 8(A) is a schematic side view of a lens-integrated optical fiber 251 of a modification of the exemplary embodiment. FIG. 8(B) is a schematic front view of the lens-integrated optical fiber 251 shown in FIG. 8(A). FIGS. 8(A) and (B) show the end of the optical fiber 220 where the lens 240 is mounted.

The lens-integrated optical fiber 251 shown in FIGS. 8(A) and (B) has a sealing agent 226 that fills around a core 222 at the end of the optical fiber 220 (refer to FIGS. 4(A) and (B)) of the lens-integrated optical fiber 250 in the second exemplary embodiment.

That is, in the modified lens-integrated optical fiber 251, the structure is similar to that of the lens-integrated optical fiber 250, except for the sealing agent 226. Thus, the modified lens-integrated optical fiber 251 has advantages similar to those of the lens-integrated optical fiber 250 in the second exemplary embodiment.

Furthermore in the lens-integrated optical fiber 251, by covering the surrounding of the core 222 with the sealing agent 226, the lens 240 can be securely mounted on the end face 222*a* of the core 222, thereby the high production yields of lens-integrated optical fiber 251 can be attained The refractive index of the sealing agent 226 can be smaller than that of the core 222 of the optical fiber 220. Further, the refractive index of lens 240 can be larger than that of sealing agent 226, and the refractive index of sealing agent 226 can be substantially equal to that of the clad 224 of the optical fiber 220. This structure allows the sealing agent 226 to act as a clad that confines light within the core 222 at the end of optical fiber 220 shown in FIGS. 8(A) and (B). Thus, loss of light, propagating through the core 222, can be reduced. This is similarly applied to exemplary embodiments and modifications described later. The material of the sealing agent 226 is not limited to a particular type, and such as thermosetting resin and ultraviolet-cured resin can be used.

Third Exemplary Embodiment

1. Structure of Lens-Integrated Optical Fiber

Figure 9A:
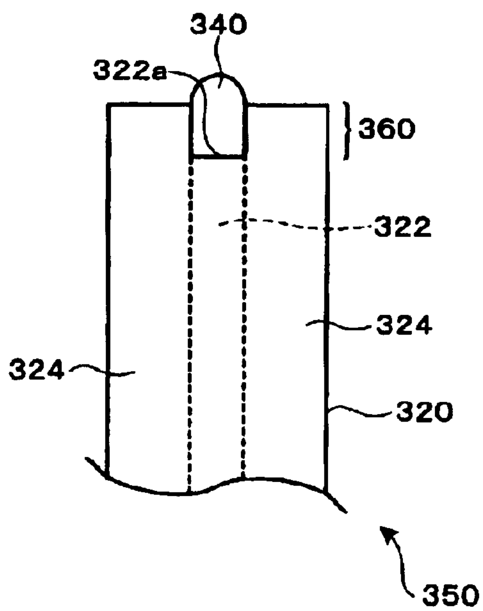
FIG. 9(A) is a schematic side view of a lens-integrated optical fiber according to a third exemplary embodiment of the present invention.
Figure 9B:
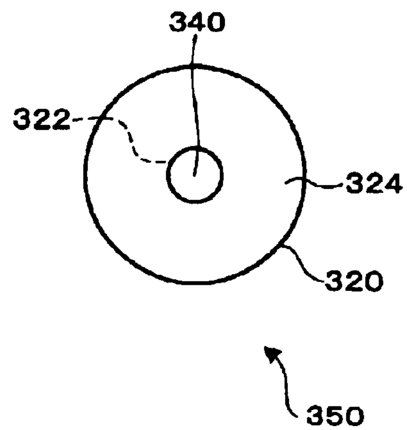
FIG. 9(B) is a schematic front view of the lens-integrated optical fiber shown in FIG. 9(A)

FIG. 9(A) is a schematic side view of a lens-integrated optical fiber 350 according to another exemplary embodiment of the present invention. FIG. 9(B) is a schematic front view of the lens-integrated optical fiber 350 shown in FIG. 9(A). FIGS. 9 (A) and (B) show the end of the optical fiber 320 where a lens 340 is mounted.

As shown in FIGS. 9(A) and (B), the lens-integrated optical fiber 350 in the exemplary embodiment includes the optical fiber 320 and the lens 340 mounted on the end face 322*a* of a core 322 of the optical fiber 320.

As shown in FIGS. 9(A) and (B), the lens-integrated optical fiber 350 is similar in structure to the lens-integrated optical fiber 250 in the second exemplary embodiment, in that at the end of optical fiber 320, the end face 322*a* of the core 322 differs in height from an end face 324*a* of a clad 324, and that the lens 340 is mounted on the end face 322*a* of the core 322 of the optical fiber 320.

On the other hand, as shown in FIGS. 9(A) and (B), the lens-integrated optical fiber 350 in the exemplary embodiment is different in structure from the lens-integrated optical fiber 250 in the second exemplary embodiment, in that at the end of the optical fiber 320, the clad 324 does not cover the core 322.

In describing the lens-integrated optical fiber 350 and production method thereof, structural elements similar to that of the lens-integrated optical fiber 250 according to the second exemplary embodiment have been given the same reference numerals, and detailed explanation for them will be omitted in principle.

Optical Fiber

The optical fiber 320 includes the core 322 and the clad 324. In the exemplary embodiment, the clad 324 does not cover the core 322 at the end of the optical fiber 320, described as above. That is, as shown in FIGS. 9(A) and (B), at the end of optical fiber 320, the end face 324*a* of the clad 324 is protruded from the end face 322*a* of the core 322, thus the core 322 and the clad 324 form a recess 360.

The optical fiber 320 can be made of materials similar to those described for the optical fiber 120 in the first exemplary embodiment.

Lens

As shown in FIGS. 9(A) and (B), the lens 340 is mounted on the end face 322*a* of the core 322 of the optical fiber 320. The lens 340 can be made of materials similar to those of the lens 140 described in the first exemplary embodiment.

The lens 340 is also formed in the method similar to that for the lens 140 in the first exemplary embodiment. To be specific, the lens 340 can be formed by curing a lens precursor (described later), which is formed by discharging a liquid drop on the end face 322*a* of the core 322 of the optical fiber 320.

2. Production Methods of Lens-Integrated Optical Fiber

Next, a production method of the lens-integrated optical fiber 350 shown in FIGS. 9(A) and (B) are explained. However, for a production step similar to that for the lens-integrated optical fiber 150 in the first exemplary embodiment, description will be omitted in principle.

Processing Core and Clad End Faces

The end faces of the core 322 and the clad 324 of the optical fiber 320 in the exemplary embodiment can be processed by the wet etching method, one of the methods described in the second exemplary embodiment. To be specific, in the wet etching, the etching is conducted under the condition that the core 322 can be selectively etched away by adjusting the type and concentration of each ingredient of the etchant.

For example, when the optical fiber 320 is a quartz optical fiber and a buffer solution of hydrofluoric acid is used as the etchant, by adjusting the concentration of the hydrofluoric acid and/or ammonium fluoride in the solution, the core 322 can be etched away selectively.

To be specific, the aqueous solution used in the second exemplary embodiment to etch away the clad can be used by adjusting the type and concentration of each ingredient.

Forming Lens

Next, the lens 340 is formed on the end face 322*a* of the core 322 of the optical fiber 320. The method to form the lens 340 in the exemplary embodiment is similar to that to form the lens 240 in the second exemplary embodiment. As for the material of the lens 340, a similar material to that of the lens 140 in the first exemplary embodiment can be used.

To be specific, a lens precursor is formed on the end face 322*a* of the core 322 by discharging a liquid drop of liquid material to form the lens 340 on the end face 322*a* of the core 322 of the optical fiber 320. Then, the lens precursor is cured by applying energy and the lens 340 is formed. Thus, the lens-integrated optical fiber 350 with the lens 340 mounted on the end face 322*a* of the core 322 of the optical fiber 320 can be provided (refer to FIGS. 9(A) and (B)).

3. Effects of the Invention

The lens-integrated optical fiber 350 and the production method thereof in the exemplary embodiment have advantages similar to those of the lens-integrated optical fiber 250 and the production method thereof in the second exemplary embodiment.

Furthermore, according to the lens-integrated optical fiber 350 in the exemplary embodiment, as shown in FIGS. 9(A) and (B), at the end of the optical fiber 320, the clad 324 does not cover the core 322. That is, the core 322 and the clad 324 form a recess 360. Because the lens 340 is mounted on the recess 360, the lens 340 mounted on the end face 322*a* of the core 322 can be fixed securely. As a result, the high production yields of the lens-integrated optical fiber 350 can be attained.

Fourth Exemplary Embodiment

Figure 10:
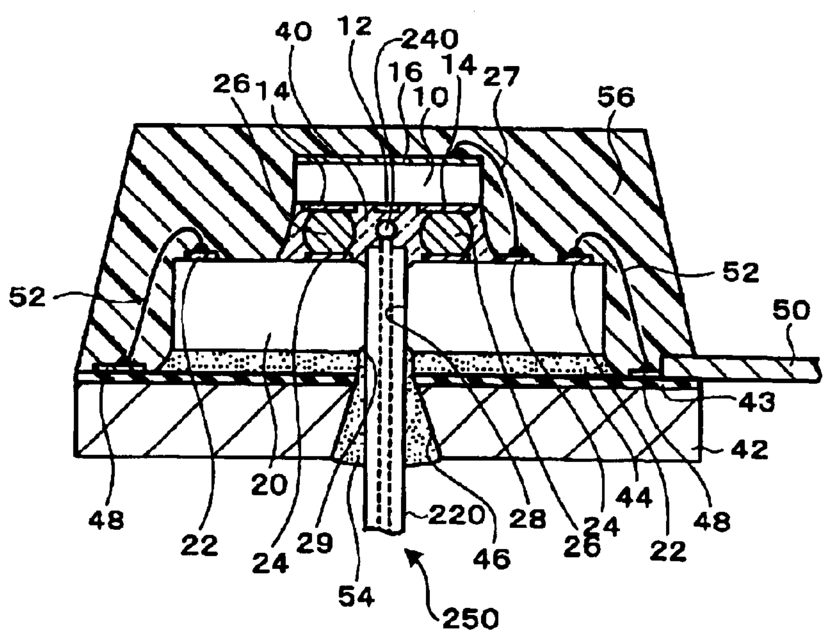
FIG. 10 schematically shows an optical module according to a fourth exemplary embodiment of the present invention.

FIG. 10 schematically shows an optical module according to a fourth exemplary embodiment of the present invention. This optical module includes an optical element 10, a semiconductor chip 20, and the lens-integrated optical fiber 250 in the second exemplary embodiment (refer to FIGS. 4(A) and (B)). Instead of the lens-integrated optical fiber 250 in the second exemplary embodiment, one of the above-described lens-integrated optical fibers in the other exemplary embodiments or the modifications may be used for this optical module.

1. Structure of Optical Module

The optical element 10 may be a light emitting element or a light receiving element. As an example for the light emitting element, a surface emitting element, in particular a surface emitting laser, can be used. The surface emitting element, like a surface emitting laser, emits light in a direction perpendicular to its substrate. The optical element 10 has an optical part 12. When the optical element 10 is a light emitting element, the optical part 12 is a light emitting part, and when the optical element 10 is a light receiving element, the optical part 12 is a light receiving part.

The relative position of the optical element 10 with the lens-integrated optical fiber 250 is fixed. To be specific, the relative position of the optical part 12 of optical element 10 with the end of the lens-integrated optical fiber. 250 is preferably fixed. To be more specific, the optical part 12 faces the lens 240 of lens-integrated optical fiber 250 in many cases. In the exemplary embodiment, the optical part 12 directly faces a hole 28 in the semiconductor chip 20.

The optical element 10 has at least one (generally two or more) electrode. For example, first electrodes 14 may be provided on the surface where the optical part 12 is formed. And at least one of a plurality of first electrodes 14 may be a dummy electrode. A dummy electrode may be made of the same material as that for the first electrodes 14, but this is not connected electrically in the optical element 10. For example, each of the first electrodes 14 may be positioned at a vertex of a polygon of more than three vertices formed by connecting all electrodes, and at least one of the electrodes may be a dummy electrode, so that the optical element 10 can be supported securely at more than three positions.

A second electrode 16 may be provided on a surface other than the surface where the first electrodes 14 are provided. When the optical element 10 is a semiconductor laser like a surface emitting laser, the second electrode 16 may be provided on the surface, which is opposite to the surface where the first electrodes 14 are provided.

The semiconductor chip 20 drives the optical element 10. The chip 20 contains a circuitry to drive the optical element 10, and has a plurality of electrodes (or pads) 22 formed on it and connected electrically to the internal circuitry. Preferably, a wiring pattern 24, connected electrically to at least one of the electrodes 22, is formed on the surface where the electrodes 22 are formed.

The semiconductor chip 20 and the optical element 10 are connected electrically to each other. For example, first electrodes 14 of the optical element 10 are connected electrically to the wiring pattern 24 formed on the semiconductor chip 20. Wires may be used for connection, and metallic bonding using solder 26, which is a type of solder, anisotropic conductive material (film) may be used to connect the first electrodes 14 and the wiring pattern 24. In this case, the optical element 10 is face-down mounted on the semiconductor chip 20, thereby the solder 26 can not only make the electrical connection but also fix the optical element 10 and the semiconductor chip 20 together. Among the first electrodes 14, preferably, the dummy electrodes 14 are also soldered to the wiring pattern 24. Thus, the optical element 10 can be reliably fixed to the semiconductor chip 20.

Furthermore, the second electrode 16 of optical element 10 is electrically connected to the wiring pattern 24. For this connection, a wire 27 may be used, or a conductive paste may be provided from the second electrode 16 to the wiring pattern 24.

An underfill material 40 may be provided between the optical element 10 and the semiconductor chip 20. When the underfill material 40 covers the optical part 12 of the optical element 10, the underfill material 40 is preferably transparent. The underfill material 40 covers and protects the electrical connections between the optical element 10 and the semiconductor chip 20, as well as protects the surfaces of the optical element 10 and the semiconductor chip 20. Furthermore, the underfill material 40 maintains the connection between the optical element 10 and the semiconductor chip 20.

The semiconductor chip 20 may have a hole 28 (a through hole, for example) formed therein. The lens-integrated optical fiber 250 is inserted into this hole 28, which is formed from the surface on which electrodes 22 are provided to the opposite surface while avoiding the internal circuitry. Preferably, the hole 28 is provided with a taper 29 formed on at least one of the hole ends. By forming the taper 29, the lens-integrated optical fiber 250 can be easily inserted into the hole 28.

The semiconductor chip 20 may be mounted on a substrate 42. Specifically, the semiconductor chip 20 may be bonded to the substrate 42 with adhesive 44. A hole 46 is formed in the substrate 42. The hole 46 is in alignment with the hole 28 in semiconductor chip 20. The adhesive 44, which bonds the semiconductor chip 20 and the substrate 42, is applied not to block the alignment of the two holes 28 and 46. The hole 46 in substrate 42 is shaped as a taper, in which the internal diameter becomes larger at the side, opposite to the semiconductor chip 20. With this taper, the lens-integrated optical fiber 250 can be easily inserted.

The substrate 42 may be formed of an insulating material like resin, glass, or a ceramic material, or of a conductive material like metal. When the substrate 42 is made of a conductive material, an insulating film 43 is provided, preferably, at least on the surface where the semiconductor chip 20 is mounted. Note that, in an exemplary embodiment described later, a similar material can be used for the substrate 42.

Preferably, the substrate 42 has a high thermal conductivity. With this characteristic, the substrate 42 speeds up the dissipation of the heat from at least one of the optical element 10 and the semiconductor chip 20. In this case, the substrate 42 acts as a heat sink or a heat spreader. In the exemplary embodiment, the substrate 42 can directly cool the semiconductor chip 20, because the semiconductor chip 20 is mounted on the substrate 42. Preferably, the adhesive 44 to bond the semiconductor chip 20 and the substrate 42 is thermally conductive. Moreover, because the semiconductor 20 is cooled, the optical element 10 bonded to semiconductor chip 20 is also cooled.

The substrate 42 is provided with a wiring pattern 48. Also, the substrate 42 is provided with external terminals 50. In the exemplary embodiment, the external terminals 50 are wire leads. The wiring pattern 48 formed on the substrate 42 is electrically connected, through wires 52, for example, to electrodes 22 of the semiconductor chip 20, the wiring pattern 24 formed on the semiconductor chip 20, and at least one of the first electrodes 14 and a second electrode 16 of the optical element 10. The wiring pattern 48 may be electrically connected to the external terminals 50.

The lens-integrated optical fiber 250 is inserted into the hole 28 in the semiconductor chip 20. Because the optical part 12 of the optical element 10 directly faces the hole 28 in the semiconductor chip 20, the lens-integrated optical fiber 250, which is inserted into the hole 28, is already aligned with the optical part 12.

The lens-integrated optical fiber 250 is passed through the hole 46 in the substrate 42. The hole 46 is shaped as a taper, in which the internal diameter becomes smaller toward the hole 28 in the semiconductor chip 20, and on the surface opposite to the semiconductor chip 20, the internal diameter of the hole 46 becomes larger than the diameter of the optical fiber 220. Preferably, the internal diameter gap between the optical fiber 220 and the surface of the hole 46 is filled with a filling material 54 of resin or the like. The filling material 54 also works to secure the lens-integrated optical fiber 250 and prevent the pull-out of the optical fiber.

In the exemplary embodiment, the optical element 10 and the semiconductor chip 20 are sealed with resin 56. The resin 56 also seals the electrical connections between the optical element 10 and the semiconductor chip 20, and the electrical connections between the semiconductor chip 20 and the wiring pattern 48 formed on the substrate 42.

2. Effects of the Invention

By incorporating the lens-integrated optical fiber 250 and the optical element 10 including the optical part 12, the optical module in the exemplary embodiment can be made smaller and of lower cost as well as less complicated, compared with a related art optical module that mounts a separate lens between an optical fiber end and an optical element.

Furthermore, compared with the related art optical module that mounts a separate lens between an optical fiber end and an optical element, because the lens 240 is integrated with the optical fiber 220 for the lens-integrated optical fiber 250 in the exemplary embodiment, aligning a separate lens with an optical fiber and an optical element is not needed any more. Because only aligning the lens-integrated optical fiber 250 and the optical element 10 is necessary, the adjustment of the light path can be simplified.

Fifth Exemplary Embodiment

Figure 11:
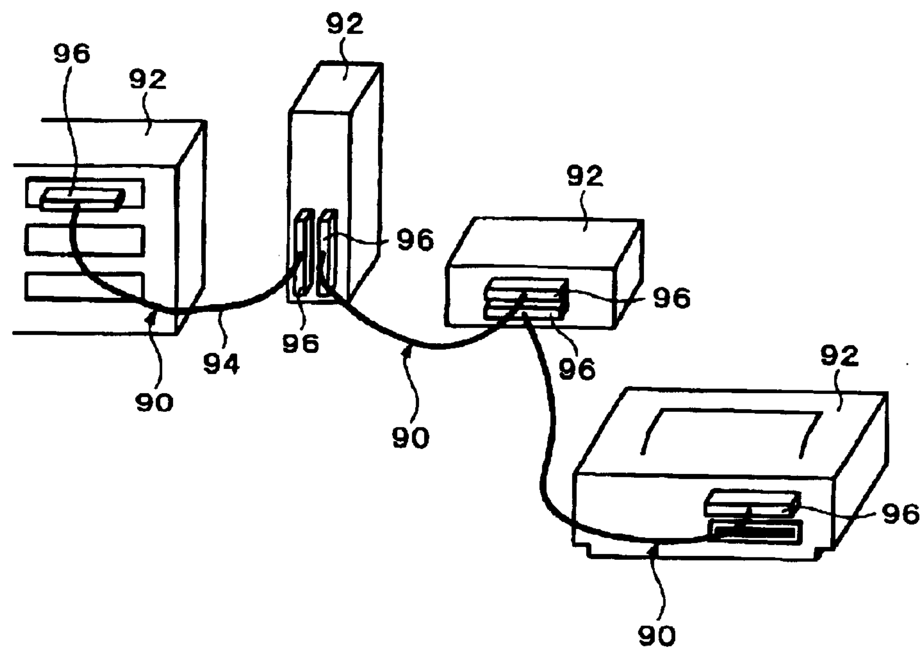
FIG. 11 schematically shows an optical transmission apparatus according to a fifth exemplary embodiment of the present invention.

FIG. 11 shows an optical transmission apparatus according to another exemplary embodiment of the present invention. An optical transmission apparatus 90 connects between electronic devices 92, such as a computer, a display monitor, a storage device, and a printer. An electronic device 92 may also be an information and telecommunication device. The optical transmission apparatus 90 may be a cable 94 provided with plugs 96 on both ends of the cable. The cable 94 includes at least one lens-integrated optical fiber 250 (refer to FIGS. 4(A) and (B)). In this case, the lens 140 is mounted on at least one end of the optical fiber 220. The plug 96 contains a semiconductor chip 20. The lens-integrated optical fiber 250, the optical element 10, and the semiconductor chip 20 are assembled in the manner described in the fourth exemplary embodiment. Note that the lens-integrated optical fiber 250 may be replaced with one of the other lens-integrated optical fibers in the exemplary embodiments or modifications described as above.

The optical element 10, connected to one end of the lens-integrated optical fiber 250, is a light emitting element. An electrical signal output from one electronic device 92 is converted into a light signal by the optical element 10, which is a light emitting element. The light signal propagates in the lens-integrated optical fiber 250 and is inputted into the other optical element 10. The other optical element 10 is a light receiving element, and converts the inputted light signal back into an electric signal, which is then inputted into the other electronic device 92. Thus, according to the optical transmission apparatus 90 in the exemplary embodiment, information transmission between electronic devices 92 by means of light signal can be realized.

Sixth Exemplary Embodiment

Figure 12:
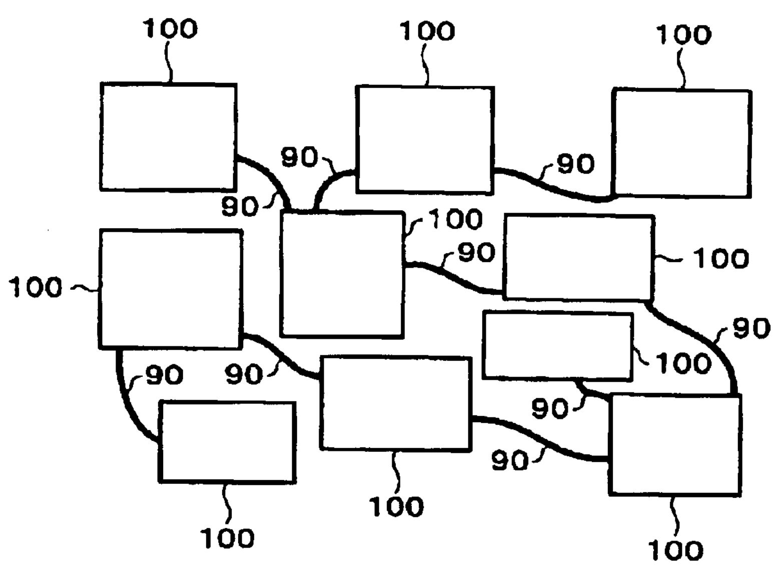
FIG. 12 schematically shows a usage in which an optical transmission apparatus according to a sixth exemplary embodiment of the present invention is used.

FIG. 12 shows a usage, in which a plurality of optical transmission apparatuses according to one exemplary embodiment of the present invention are used. The optical transmission apparatus 90 connects between electronic devices 100. As for examples of the electronic device 100, a liquid-crystal display monitor or digital-input compatible CRT displays (which may be used in the field of finance, web sales, medical care, education), liquid-crystal projectors, plasma display panel (PDP), digital TV, Point-Of-Sale scanning at cash registers, video tape recorders, TV tuners, game equipment, and printers.

The present invention is not limited to the above-described embodiments, but can be applied to various kinds of modifications. For example, the present invention includes substantially identical structures (such as a structure with its function, method, and result being identical, or a structure with its object and result being identical). The present invention also includes a structure described in the Detailed Description of the Exemplary Embodiments with its unessential part replaced by a substitution. The present invention also includes a structure with its action and effect are identical to one of those described in the Detailed Description of the Exemplary Embodiments, or a structure that can achieve an object that is identical to one of those described in the Detailed Description of the Exemplary Embodiments. The present invention also includes a structure, in which publicly know art is added to those described in the Detailed Description of the Exemplary Embodiments.

What is claimed is:

1. A lens-integrated optical fiber, comprising:

an optical fiber including a core and a clad;

a lens mounted on an end face of the core at an end face of the optical fiber;

the lens being formed so that the maximum width $d_2$ of the maximum cross section $S_1$ of the lens is greater than the maximum width $d_1$ of the end face of the optical fiber, where the maximum cross section $S_1$ is the cross section of the lens cut by a plane that is parallel with the an end face of the optical fiber and that makes the cross sectional area of the lens greatest; and the core being uncladded at an end of the optical fiber.

2. The lens-integrated optical fiber according to claim 1, the end face of the core differing from an end face of the clad in height at the end of the optical fiber; and the core and the clad forming a protrusion at an end of the optical fiber.

3. The lens-integrated optical fiber according to claim 1, a refractive index of the lens being substantially equal to a refractive index of the core.

4. The lens-integrated optical fiber according to the claim 1, a surrounding of the core being covered with a sealing agent at the end of the optical fiber.

5. The lens-integrated optical fiber according to claim 4, the refractive index of the lens being greater than a refractive index of the sealing agent, and the refractive index of the sealing agent being substantially equal to the refractive index of the clad.

6. The lens-integrated optical fiber according to claim 1, the core and the clad forming a recess at the end of the optical fiber.

7. The lens-integrated optical fiber according to claim 1, the lens being formed by curing a liquid material that is curable by applying energy to the liquid material.

8. The lens-integrated optical fiber according to claim 7, the lens being made of ultraviolet-cured resin.

9. An optical module, comprising:

the lens-integrated optical fiber according to claim 1;

an optical element having an optical part; and a semiconductor chip electrically connected to the optical element.

10. An optical transmission apparatus, comprising:

the lens-integrated optical fiber according to claim 1;

a light emitting element placed while directing a light emitting part of the light emitting element to one end face of the optical fiber;

a semiconductor chip electrically coupled to the light emitting element and packaged together with the light emitting element;

a light receiving element that is placed while directing a light receiving part of the light receiving element to the other end face of the optical fiber; and a semiconductor chip electrically coupled to the light receiving element and packaged together with the light receiving element.

11. A lens-integrated optical fiber comprising:

an optical fiber including a core and a clad;

a lens mounted on an end face of the core at an end face of the optical fiber;

the lens being formed so that the maximum width $d_4$ of the maximum cross section $S_2$ of the lens is greater than the maximum width $d_3$ of the end face of the core, where the maximum cross section $S_2$ is the cross section of the lens cut by a plane that is parallel with the end face of the core and that makes the cross section area of the lens greatest; and the core being uncladded at the end of the optical fiber.

12. A method to produce a lens-integrated optical fiber, comprising:

(a) forming a lens precursor on the end face of the optical fiber by discharging a liquid drop on the end face of the optical fiber; and (b) forming a lens by curing the lens precursor, the lens being formed so that the maximum width $d_2$ of the maximum cross section $S_1$ of the lens is greater than the maximum width $d_1$ of the end face of the optical fiber, where the maximum cross section $S_1$ is the cross section of the lens cut by a plane that is parallel with the end face of the optical fiber and that makes the cross section area of the lens greatest;

(c) forming the end of the optical fiber so that the end face of the core differs in height from the end face of the clad, prior to (a) and (b);

removing the clad around the core at the end of the optical fiber; and extending the core at the end of the optical fiber.

13. The method to produce a lens-integrated optical fiber according to claim 12, an inkjet method being used to discharge the liquid drop.

14. The method to produce a lens-integrated optical fiber according to claim 12, the lens precursor being cured by applying energy to the lens precursor.

15. The method to produce a lens-integrated optical fiber according to claim 14:

the lens precursor being made of ultraviolet-cured resin, the energy being ultraviolet light, and the lens precursor is cured by the ultraviolet light, incident into the end face of the core at one end of the optical fiber, propagates in the core, exits from the other end of the optical fiber, and irradiates the lens precursor.

16. A method to produce a lens-integrated optical fiber, comprising:

(a) forming a lens precursor on the end face of the core by discharging a liquid drop on the end face of the core, at an end of an optical fiber including a core and a clad; and (b) forming a lens by curing the lens precursor;

(c) forming the end of the optical fiber so that the end face of the core differs in height from the end face of the clad, prior to (a) and (b);

removing the clad around the core at the end of the optical fiber; and extending the core at the end of the optical fiber.

17. The method to produce a lens-integrated optical fiber according to the claim 16, further comprising:

(d) covering a surrounding of the core with a sealing agent.

18. The method to produce a lens-integrated optical fiber according to the claim 17, the lens being formed so that the maximum width $d_4$ of the maximum cross section $S_2$ of the lens is greater than the maximum width $d_3$ of the end face of the core, where the maximum cross section $S_2$ is the cross section of the lens cut by a plane that is parallel with the end face of the core and that makes the cross section area of the lens greatest.

19. A lens-integrated optical fiber, comprising:

an optical fiber including a core and a clad;

a lens mounted on an end face of the core at an end face of the optical fiber;

the lens being formed so that the maximum width $d_2$ of the maximum cross section $S_1$ of the lens is greater than the maximum width $d_1$ of the end face of the optical fiber, where the maximum cross section $S_1$ is the cross section of the lens cut by a plane that is parallel with the end face of the optical fiber and that makes the cross sectional area of the lens greatest;

the end face of the core is higher than the end face of the clad at the end of the optical fiber.

* * * * *